Feb. 14, 1950    J. W. HORNING    2,497,772
PACK-TYPE PARACHUTE AND RELEASING MEANS
Filed June 27, 1947    5 Sheets-Sheet 1
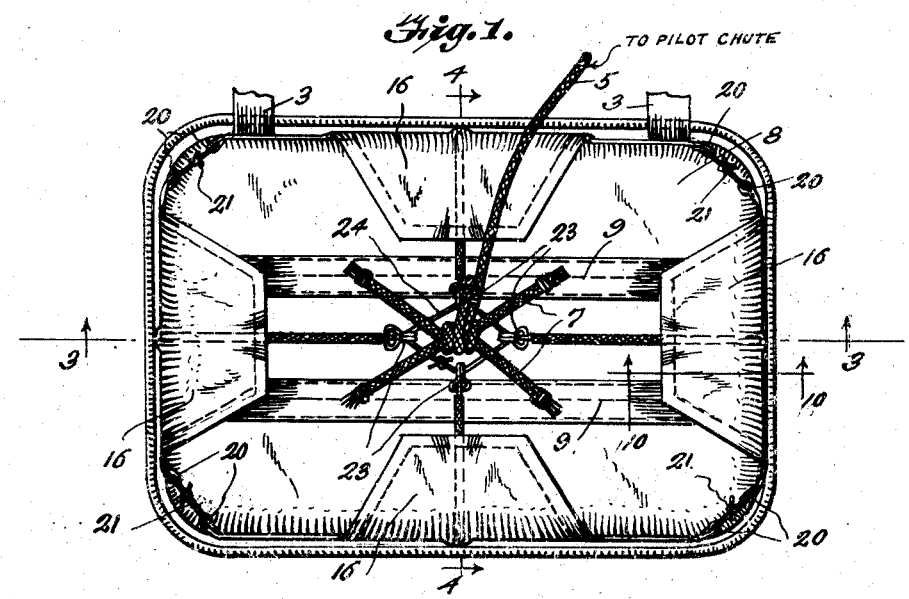
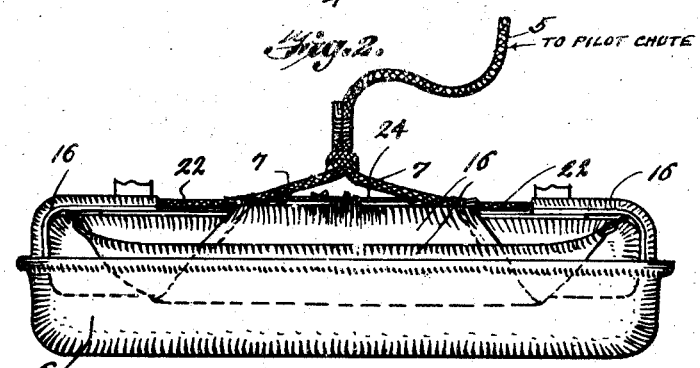
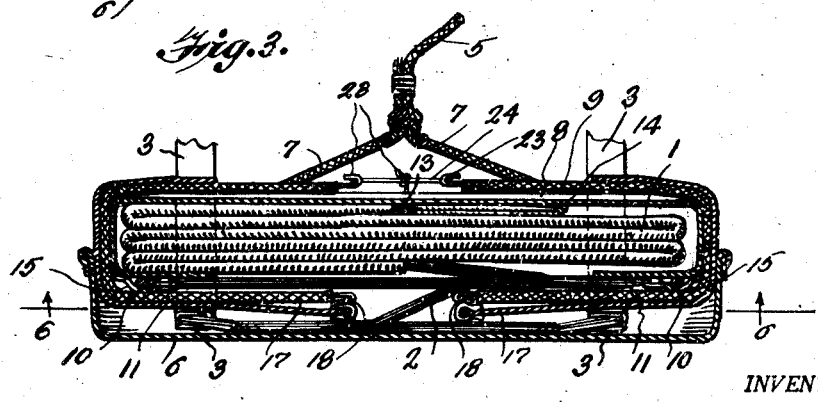
INVENTOR.
JAMES W. HORNING
BY
Russ D. Woodward.

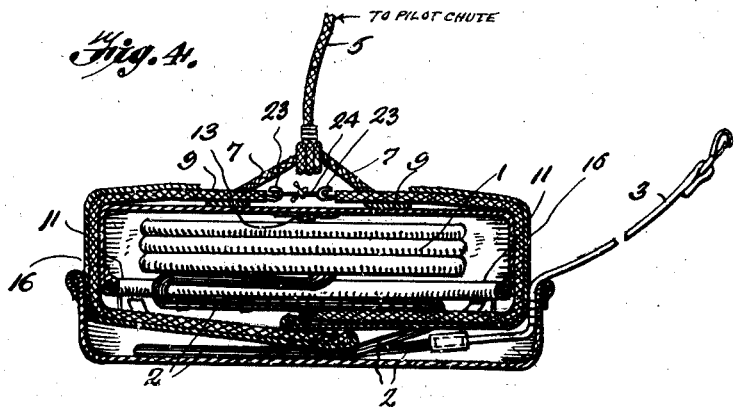

Feb. 14, 1950 J. W. HORNING 2,497,772
PACK-TYPE PARACHUTE AND RELEASING MEANS
Filed June 27, 1947 5 Sheets-Sheet 3

INVENTOR.
JAMES W. HORNING
BY

Feb. 14, 1950  J. W. HORNING  2,497,772
PACK-TYPE PARACHUTE AND RELEASING MEANS
Filed June 27, 1947  5 Sheets-Sheet 4

INVENTOR.
JAMES W. HORNING

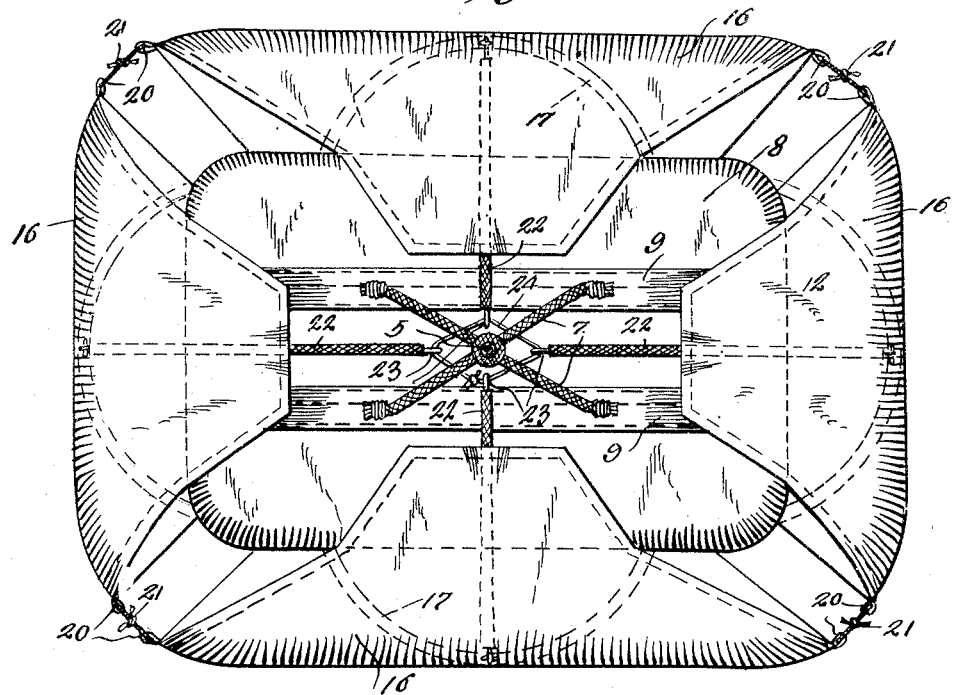
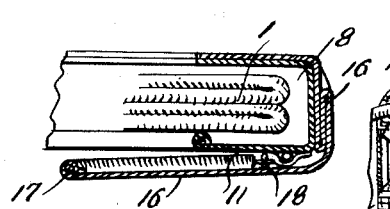
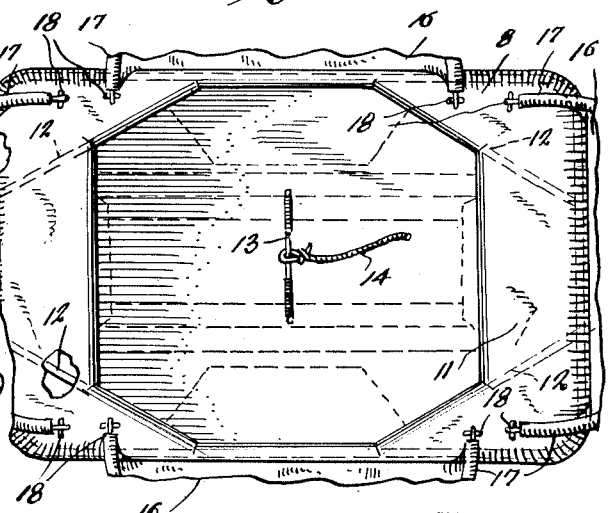
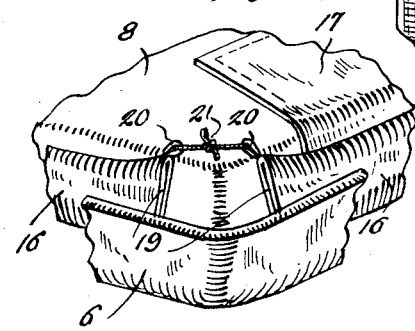

Patented Feb. 14, 1950

2,497,772

UNITED STATES PATENT OFFICE 2,497,772

PACK-TYPE PARACHUTE AND RELEASING MEANS

James W. Horning, Bloomsburg, Pa., assignor of one-half to Samuel H. Evert, Bloomsburg, Pa.

Application June 27, 1947, Serial No. 757,441

6 Claims. (Cl. 244—148)

This invention relates to parachutes of the pack type used by aviators making jumps from airplanes.

At the present time it is customary to so fold and pack the canopy and the shroud lines that when a jump is made the canopy is first withdrawn and then the shroud lines. As the canopy is withdrawn it is carried laterally by the slip stream and is in such position that after the canopy has all been withdrawn and the shroud lines are then withdrawn and pulled downwardly by the weight of the aviator for causing righting of the canopy the lines are liable to become entangled with the canopy and prevent it from righting itself and opening. Therefore the aviator falls without his descent being checked by the parachute and he is liable to be killed or badly injured.

Therefore one object of the invention is to provide a parachute so packed that when a jump is made the shrouds will be first withdrawn and then the canopy, thus causing the shroud lines to be entirely withdrawn to an extended position before the canopy is released and allowing the canopy to immediately start opening as it is withdrawn. It will thus be seen that the canopy will be withdrawn in its proper position above the shroud lines and be quickly opened and entirely extended by the time it has been withdrawn from the pack.

Another object of the invention is to provide a parachute wherein the canopy and the shroud lines are packed in a cover instead of in the pack tray carried by the harness, the cover being provided with wings or air pockets which are pulled toward an extended position as the cover and tray are dragged loose from each other after the pilot chute has been released and serve to form the cover into an auxiliary pilot chute which assists in causing the shroud lines and the canopy to be released as the aviator drops toward the earth.

Another object of the invention is to provide a cover into which the canopy may be closely packed and prevented from shifting therein and becoming tangled as it is withdrawn.

Another object of the invention is to provide a parachute wherein the cover into which the canopy is packed carries wings or ears so formed and mounted that they may be folded closely against the cover when the parachute is packed, elastic means being provided for swinging the wings upwardly to an extended position, and the said elastic members being so mounted that they may be tensioned after the cover with the folded wings have been applied to the tray and thus prevent the wings from moving toward an extended position as the cover is applied to the tray.

Another object of the invention is to provide a parachute having wings applied to a cover in such manner that when they are extended they will not be torn loose by pull of air filling the wings.

Another object of the invention is to provide a parachute which is simple in construction, quick and efficient in operation, easy to pack, and capable of being manufactured at low cost.

The invention is illustrated in the accompanying drawings wherein:

Fig. 1 is a top plan view of the improved pack after the pilot chute has been released.

Fig. 2 is a side elevation of the parachute pack.

Fig. 3 is a sectional view taken along the line 3—3 of Figure 1.

Fig. 4 is a sectional view taken along the line 4—4 of Figure 1.

Fig. 5 is a sectional view similar to Figure 3 showing the packed parachute pulled from the tray and wings of the cover extended.

Fig. 9 is a top plan view of Figure 8 with the pilot chute omitted.

Fig. 10 is a fragmentary sectional view taken along the line 10—10 of Figure 1.

Fig. 11 is a perspective view of a corner portion of the cover and the pack tray.

Fig. 12 is a bottom plan view of the cover showing a portion of the line connecting the cover with the canopy of the parachute.

This improved parachute pack is used for stowing a parachute of conventional design and dimensions. The parachute has a canopy 1 and the usual shroud lines 2 which are attached at their lower ends to the risers or straps 3 by means of which the parachute is connected with the harness worn by the person who is to make a jump. There has also been provided the usual pilot chute 4 connected with a pull rope or line 5 and to the harness worn by the aviator is mounted a pack tray 6 of conventional size and shape.

Figure 6:
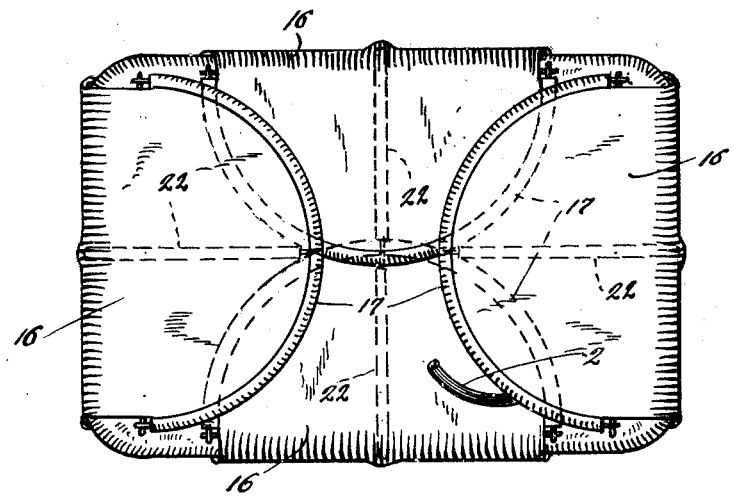
Fig. 6 is a view taken along the line 6—6 of Figure 3 looking at the bottom of the packed parachute with the pack tray removed.
Figure 7:
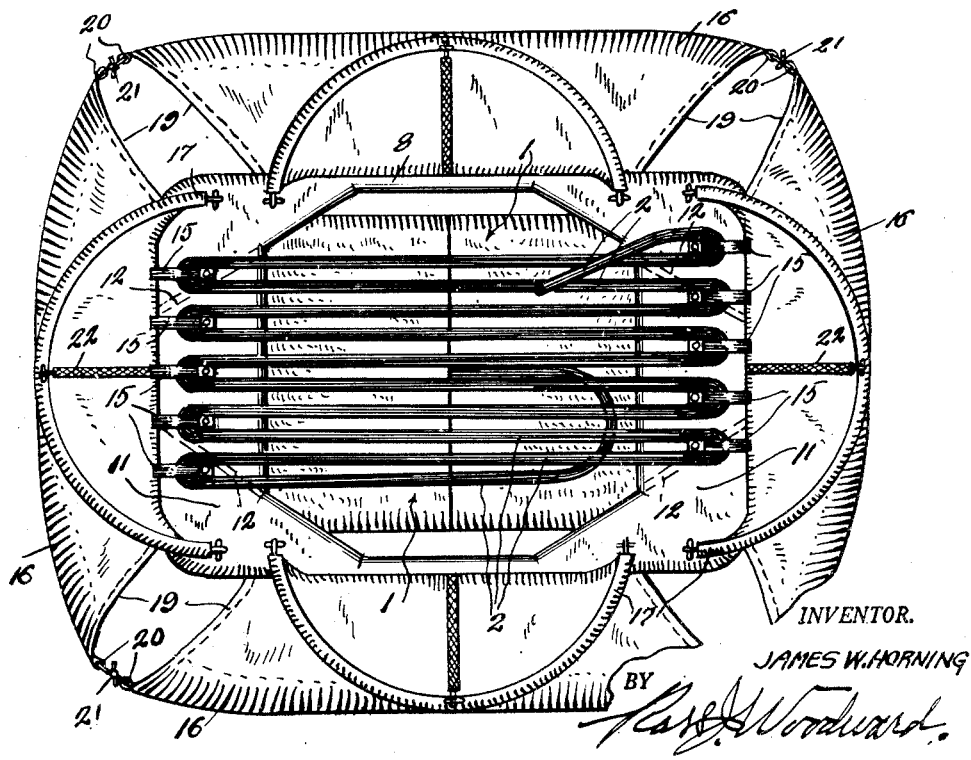
Fig. 7 is a view taken along the line 7—7 of Figure 5.

Instead of having the rope 5 directly connected with the canopy centrally of the vent opening thereof this rope is tied to a pair of halter ropes 7 mounted in crossed relation to each other centrally of the top of a cover 8. This cover is formed of strong fabric, such as canvas, and is reinforced by fabric strips 9 to which the ropes 7 are secured. Marginal portions of the cover are turned downwardly to form side and end walls for the cover, as shown in Figures 4 and 5, and edges of the fabric sheet of fabric from which the cover is formed are secured about a metal frame 10 to which are also secured fabric webs 11 which are reinforced by metal rods 12 and form the cover with a mouth of reduced dimensions, as shown in Figures 7 and 12. A short rope 13 is secured to the under or inner face of the top of the cover and to this rope is connected the upper end of the rope 14 leading from the vent opening at the center of the canopy 1. Tapes 15 are mounted at outer edges of the webs 11 and spaced from each other transversely of the webs and these tapes carry at their free ends snap fastener members for engaging companion snap fastener members carried by the webs so that the tapes may be releasably secured across folds of the shroud lines 2. By so forming the cover and so connecting the canopy 1 and the pilot chute with it, the canopy may be folded in a conventional manner and stowed within the cover, the cover being in an inverted position, and the shroud lines then strung back and forth across the bottom of the cover and secured at folds by the tapes. After the shroud lines have been engaged with the tapes lower portions of the shroud lines are coiled upon the secured portions of the shroud lines and wings or air pockets 16 carried by the cover are moved to the position shown in Figure 6. These wings or ears are formed of silk, or other light weight fabric, and have tapered upper portions sewed along their edges to upper surfaces of side and end portions of the cover, as shown in Figure 1. Lower edges of the sheets of fabric from which the ears are formed are secured about arcuate rods or yokes 17 which are pivoted to corner portions of the webs 11 as shown at 18, thereby pivotally mounting the binding rods or yokes so that they may have swinging movement from the folded position shown in Figure 6 to the extended position shown in Figure 7. Seams 19 along sides of the pockets are provided with eyes or loops 20 at their outer ends through which cords 21 are tied to temporarily connect adjacent side edges of pockets or ears and thus allow them to be held close to corner portions of the cover when the ears are in the folded position. When the ears are swung outwardly to an extended position the cords may, or may not, be broken by a snapping strain, and if they are broken they will be replaced with other cords when again packing the parachute. Elastic pull lines or cords 22 are secured at their outer ends to the yokes or frames 17 midway the width thereof, and these pull lines extend inwardly of the pockets with their inner end portions passing between inner end portions thereof and the top of the cover 8. Hooks 23 are mounted at inner ends of the pull lines so that after the pockets or ears have been swung to the folded position shown in Figure 6 and the stowed canopy and shroud lines fitted into the tray 6 as shown in Figures 2 and 3, upper ends of the lines 22 may be pulled toward each to tension them and a cord 24 then engaged with the hooks and tied to hold the lines under tension. The pilot chute is then drawn snugly about the cover and walls of the tray and secured by a conventional rip cord and the parachute is ready for use.

Figure 8:
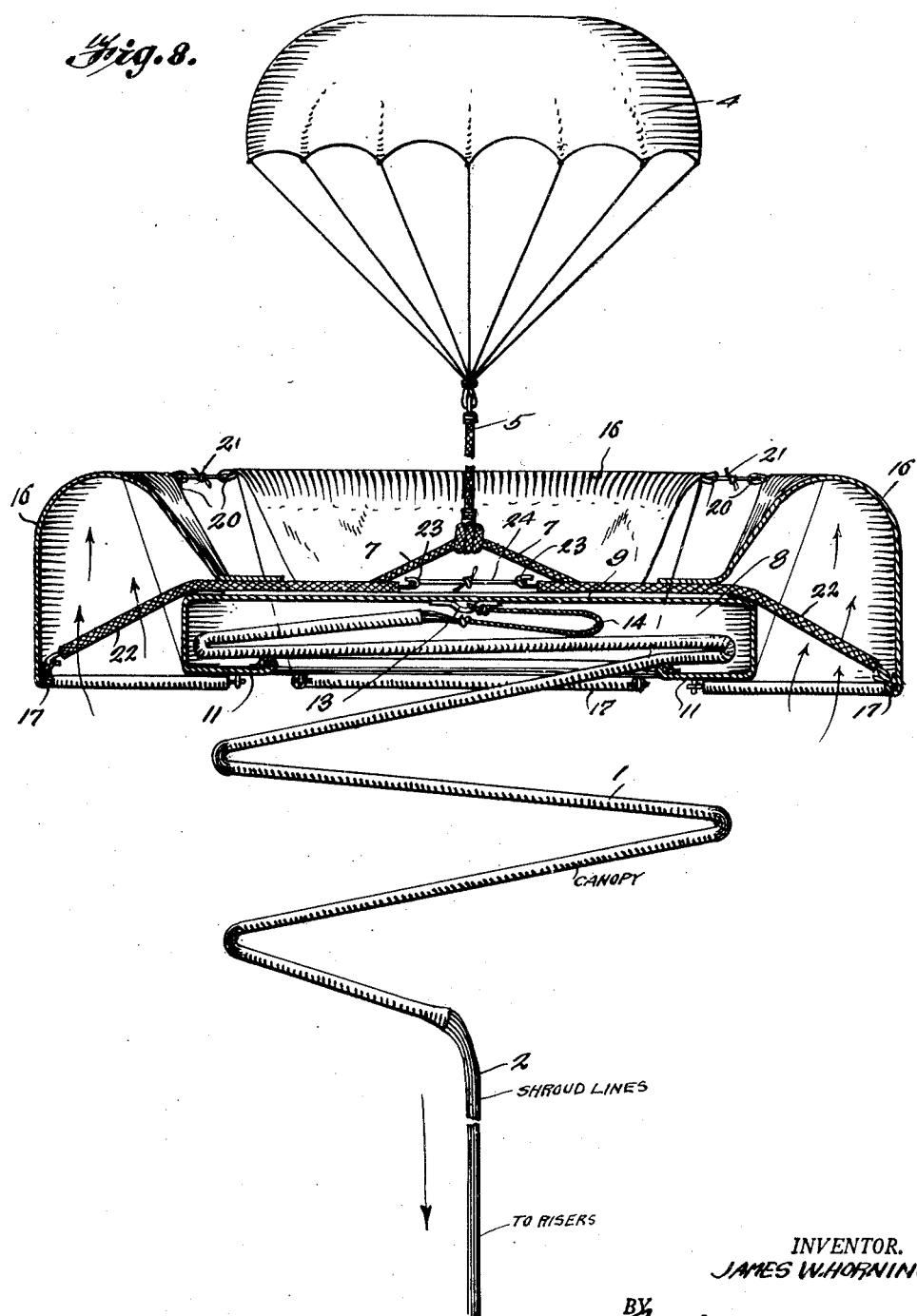
Fig. 8 is a view similar to Figure 5 showing the pilot chute connected with the cover and the canopy of the parachute partially withdrawn from the cover.

When a jump is to be made the aviator jumps from the moving airplane and after falling a suitable distance below the airplane the rip cord is pulled to release the pilot chute which is carried upwardly and exerts pull upon the cover to displace the cover from the tray. As the cover is displaced from the tray the elastic pull lines swing the ears or pockets outwardly and upwardly and they move to an extended position so that they will be filled with air and assist the pilot chute to support the cover. The tray remains in position upon the harness worn by the aviator and as the aviator drops downwardly from the cover the shroud lines will be drawn downwardly after him, the inner ends of the tapes 15 being successively released from the webs 11 until the shroud lines have been completely detached from the webs. The canopy is then pulled out of the cover through the constructed mouth thereof and as it is drawn from the cover it will begin to open and the shroud lines will be spread. It will thus be seen that the canopy is withdrawn from the cover after the shroud lines have been fully released from the cover and that since the canopy will be above the shroud lines it can not become entangled with the shroud lines. In addition the canopy begins to open immediately upon its being pulled out of the cover and this spreads the shroud lines and also causes it to be very quickly withdrawn from the cover which remains in place over the opened canopy with the pilot chute attached to it. The manner in which the shroud lines are first pulled free from the cover and then the canopy is shown in Figures 5 and 8 but it will be understood that the canopy begins to open as soon as its marginal portion is withdrawn from the cover instead of remaining in the compact mass shown in Figure 8. After a jump has been made the canopy is again packed in the cover, the shroud lines folded upon the tray and secured by the tapes 15 and the cord 24 broken so that the wings or ears may be again swung to the folded position under the cover and the cover thrust into the tray, the pull lines then pulled outwardly and tied by a cord and the pilot chutes applied to the cover and the tray and secured by a rip cord.

Having thus described the invention, what is claimed is:

1. In a parachute, a pack tray, a canopy, shroud lines for said canopy, a cover, the canopy being stowed within the cover through an opening in the bottom thereof and the shroud lines being folded against the bottom of the cover and detachably secured with portions extending therefrom for connection with risers of a harness, ears carried by said cover and movable from a folded position in covering relation to the shroud lines and the bottom of the cover to an extended position outwardly and upwardly from marginal edge portions of the cover when the cover is withdrawn from the pack tray, elastic pull lines carried by the ears, a cord detachably connecting the pull lines with each and releasably holding the pull lines under sufficient tension to pull the ears to the extended position, and a pilot chute mounted over the cover centrally thereof for pulling the cover out of the tray.

2. In a parachute, a canopy, shroud lines for said canopy, a cover open at its bottom, the canopy being stowed within the cover through the bottom opening thereof and the shroud lines being folded and detachably secured against the bottom of the cover, fabric ears carried by said cover and movable from a folded position under the cover to an extended position and when extended forming air pockets, elastic pull lines carried by said ears and extending across the cover and releasably held under tension, and a pilot chute connected with the cover.

3. In a parachute, a cover open at its bottom, a canopy connected with said cover and stowed within the cover through the open bottom thereof, shroud lines folded against the bottom of the cover with portions extending therefrom for connection with risers of a harness whereby as a jump is made the shrouds will first be drawn to an extended position and then the canopy withdrawn from the cover, sheets of fabric carried by said cover and movable from a folded position against the cover to an extended position in which they form air pockets and elastic pull lines for urging the fabric sheets to an extended position.

4. In a parachute, a canopy, shroud lines for said canopy, a cover having a top and side walls and end walls, said cover being of dimensions adapting it to fit within a pack tray, webs extending across end portions of the cover and defining a reduced opening through the bottom of the cover, the canopy being connected with the cover and being stowed into the cover through the bottom opening thereof, tapes carried by said webs for engaging portions of the shroud lines and releasably holding the same against the webs with portions extending across the opening between the webs, yokes pivoted to the webs at corners of the cover for swinging movement from a folded position under the cover to an extended position outwardly of the cover, sheets of fabric secured to the yokes and having portions secured upon the outer surface of the top of the cover, the yokes and said fabric sheets forming pockets moved to an extended position by air currents, elastic pull lines connected with the yokes for swinging the yokes toward an extended position when the cover is dislodged from a pack tray, and a pilot chute connected with the top of the cover.

5. In a parachute, a cover open at its bottom, a canopy connected with the cover and stowed into the cover through the open bottom thereof, shroud lines for said canopy, releasable fasteners for releasably holding the shroud lines close against the bottom of the cover, air pockets carried by the cover and movable from a folded position under the cover to an extended position laterally of the cover when the cover is dislodged from the pack tray, elastic pull lines attached to edge portions of said pockets and extending across the top of said cover, and a looped cord engaged with ends of the pull lines and holding the pull lines under tension until broken.

6. A pack cover for a parachute comprising a body open at its bottom for insertion of the canopy of a parachute and having side walls and end walls, tapes carried by opposed walls of the body and spaced from each other transversely thereof, said tapes being of a length adapting them to be engaged about portions of bunched shroud lines of a parachute and hold the said shroud lines in position to extend back and forth across the open bottom of the pack cover and under a canopy stored in the cover, and members for securing the tapes about the said portions of the shroud lines adapted to be released by downward pull exerted upon the shroud lines, whereby when a jump is made the shroud lines will be first drawn downwardly from the cover and the canopy then pulled downwardly out of the cover above the shroud lines in position for opening.

JAMES W. HORNING.

REFERENCES CITED

The following references are of record in the file of this patent:

UNITED STATES PATENTS

| Number | Name | Date |
|---|---|---|
| 1,487,825 | Watkins | Mar. 25, 1924 |
| 1,603,648 | Thornblad | Oct. 19, 1926 |
| 1,795,168 | Habermehl | Mar. 3, 1931 |
| 2,383,293 | Dearstyne et al. | Aug. 21, 1945 |

FOREIGN PATENTS

| Number | Country | Date |
|---|---|---|
| 147,993 | Great Britain | July 23, 1920 |
| 155,787 | Great Britain | Dec. 23, 1920 |